Sept. 29, 1964  M. L. OBITTS  3,150,406
WASH KIT WITH CONTACT LENS STORING AND PLACING DEVICES
Filed Nov. 13, 1962  3 Sheets-Sheet 1

INVENTOR.
MILTON L. OBITTS
BY Bosworth, Sessions,
Herrstrom & Knowles
ATTORNEYS.

United States Patent Office 3,150,406
Patented Sept. 29, 1964

3,150,406
WASH KIT WITH CONTACT LENS STORING
AND PLACING DEVICES
Milton L. Obitts, Box 253, La Grange, Ohio
Filed Nov. 13, 1962, Ser. No. 237,058
25 Claims. (Cl. 15—512)

This invention relates to wash kits for contact lenses and similar ophthalmological appliances, more particularly to devices used in such kits for carrying, scrubbing, storing and placing lenses. The present invention is the result of further development of the type of kit disclosed in my application for United States Patent, Serial No. 42,345, filed July 12, 1960, now Pat. No. 3,063,083.

One of the principal objects of the invention is to provide handy, economical, attractive and generally improved means for carrying and manipulating thin fragile objects such as contact lenses, for cleansing them in a wiping or scrubbing action without risk of breakage or loss, for storing them in such a way that they will be readily available for use when desired, and for supporting and manipulating them when placing them against the eye of the wearer.

More particularly, with reference to the carrier means or grippers it is sought to provide an improved tongs which is capable of holding lenses of different diameters without subjecting them to objectionable squeezing forces and which is itself sturdy and long lasting in use. As a further refinement of this aspect of the invention it is sought to provide a carrier tongs suitable for economical manufacture in large quantity by injection molding of plastic material with minimum requirement for hand operations or finishing touches.

Another object is to provide a lens carrier tongs for yieldably gripping and holding a fragile lens or similar disc-like object by its periphery, leaving the faces of the object clear and unobstructed for treatment as in washing, repairing and adjusting; this aspect of the invention is more particularly concerned with the provision of molded plastic tongs of the type having spaced leg members connected by a bridge fulcrum, it being sought to provide an arrangement in which the fulcrum or bridge yields in order to permit the holding portions of the tongs to accommodate lenses or similar articles of different diameters without setting up objectionable stresses in the tongs or excessively high compressive forces on the objects being held.

With respect to the lens washing and scrubbing aspects of the invention it is sought to provide an improved scrubber assembly in which soft sponging elements are strongly anchored against dislodgement, in which an enclosed washway is provided to eliminate movement of a lens laterally out of the washway during the washing operation, in which the scrubber is readily assembled and disassembled not only in original manufacture, but also for the purpose of cleaning or replacing the soft washing elements, and in which the major frame members are identical in shape so that they can be cheaply manufactured.

With respect to the lens storage aspects of the invention, it is sought to provide a device which can be included in the wash kit in a compact arrangement economical spacewise. More particularly it is sought to provide a storage device for keeping contact lenses in identifiable relationship, immersed in a suitable liquid, ready and handy for immediate use. As a specialized refinement of this aspect of the invention it is sought to provide a lens storage device mounted in removable relation on the carrier tongs assembly, interlockable with the receptacle in a snap fit arrangement for holding the device while the user is removing or replacing lenses and which can be carried separately from the wash kit if so desired.

With respect to the lens placing device, it is sought to provide a yieldable support for a contact lens which will enable the user to place the lens against the eye with minimum discomfort and without danger of injury to either the eye or the lens.

Other objects and advantages relate to specialized features of construction and combinations and arrangements of parts to achieve ease and reliability in operation, simplicity and economy in manufacture and compactness so as to minimize space requirements for the kit. The invention is described in connection with the accompanying drawings forming part of the specification, such drawings showing preferred embodiments representing the best known mode of practicing the invention.

The contact lens washing kit of the present invention provides washing and rinsing chambers 1, 2 in a suitable receptacle 3 formed as by injection molding of a suitable synthetic plastic material such as a styrene compound or methyl methacrylate, as more fully described in application for United States patent, Serial No. 42,345, for Wash Kit for Contact Lenses and the Like, now Pat. No. 3,063,083. The chambers are defined by an internal integral partition 4 and the receptacle has a separately molded bottom 5 transversely grooved in the center to receive the partition 4 and rabbeted peripherally to receive the lower edges of the walls, the parts being cemented together. Openings 7, 8 in necks 9, 10 provide access to the chambers 1, 2 for scrubber and gripper assemblies, respectively. The necks have smooth internal substantially cylindrical surfaces and have external threads for screwing thereon the tubular body member of the scrubber assembly and the cap which constitutes the handle of the lens gripper. The receptacle 3 has flat parallel front and back sides 6 and cylindrically curved ends 11.

The lens carrier is in the form of a molded plastic tongs secured to the inside of a molded plastic cap 12 screwed onto the neck 10 for facile removal and replacement. The carrier tongs has a circular base 16 cemented in a cylindrically walled socket 15 of the cap 12. The tongs and the cap are separately formed as by injection molding of suitable long lasting, chemically inactive plastic material such as polystyrene modified for resiliency and toughness. Legs 18, 19 of the tongs project from the base 16 in spaced, generally converging side by side relation. The upper or near ends of the legs disposed in the cap 12 are integral and rigid with the base 16.

The remote or distal ends of the legs are formed with arcuately curved holding portions 20, 21 disposed in a common plane and having concave confronting sides. Each holding portion is integrally connected to the corresponding leg by a sharply angled joint 22 so that the portions 20, 21, which grip the periphery of a circular lens lie in a common circle when spread slightly apart to receive the lens L. The distal ends of the legs, comprising the gripping portions 20, 21 thus are first divergent and then convergent to define a protectively surrounded lens receiving zone.

To actuate the tongs for receiving or releasing a contact lens, the legs 18, 19 are squeezed together as by pinching them between thumb and forefinger to apply opposed forces at points located intermediate their near or base ends and a fulcrum post 26. This fulcrum may comprise a suitable protuberance integrally molded on one of the legs and engageable with the other, may comprise two opposed protuberances molded one on each of the legs, or, preferably and as shown, it may comprise a connector integrally joined and of small cross section relative to the legs. It is readily bent or deformed in flexing the legs. When the legs are squeezed together, as mentioned, their distal or gripping ends are spread apart to increase the size of the lens receiving zone so that the lens L may be placed between the arcuate portions 20, 21, the latter being formed on their confronting concave sides with circumferential grooves which receive the periphery of the lens in socketed relation. The legs are similarly squeezed to separate the holding portions 20, 21 when it is desired to remove the lens L from the holder.

In the normal or unstressed condition of the carrier tongs the distance across the lens receiving zone between the holder ends 20, 21 is slightly less than the diameter or transverse dimension of the contact lens for which the tongs is designed. Thus, when the lens is engaged between the holder ends, the latter yieldingly grip the lens by reason of their inherent resiliency, the integral connector fulcrum 26 being under tension. The lens is located with its circular periphery in the plane of the holder ends, substantially completely surrounded by the latter.

The lens washing kit also includes a scrubber assembly carried by the neck 9 and suspended in a suitable washing liquid contained in the chamber 1. A molded plastic tubular body 40, having external threads on its upper end and internal threads 41 in its larger diameter lower end is received over the opening 7, the lower threads mating with the external threads of the receptacle neck 9. The upper end of the body 40 has an internal cylindrical wall 44 which registers with but is of slightly larger diameter than the neck opening 7. A closure and sealing cap 46 is received over the open end of the body 40, being threaded onto the reduced upper end of the latter. Suitable washing means comprising a pair of juxtaposed soft strips 48, 49 of sponge, polyurethane foam or similar material is suspended in the washing chamber as by companion frame members 50, 51 secured at their upper ends to the body member 40. The frame members 50, 51 are desirably formed as by injection molding of suitable plastic material such as that referred to for the carrier tongs and they may be of identical construction, as shown. They have spaced confronting parallel surfaces 52, 53 against which the soft sponges 48, 49 are disposed and which, together with the foam sponges define a vertical washway into which the lens L carried by the tongs is thrust for cleaning. To prevent dislodgment of the sponges 48, 49, their upper and lower ends 54, 55 are passed outwardly through slots 56 in the frame members and then reversely bent over and impaled on and wedged under outwardly angled retainers 57 molded integrally with and located on the outer faces of the frame members. Upper ends 58 of the frame members are offset laterally and nested against the cylindrical surface 44 of the body member 40; they provide an entry vestibule 59 through which a lens to be washed is inserted into the lower washway.

Each of the upper frame portions 58 is formed with a number of parallel triangular ribs 61 the lower edges of which are integrally joined to a horizontal segmental shelf 62 located at the juncture of the upper frame portion with the lower frame portion which carries one of the wash sponges 48, 49. The hypotenuse edges of the ribs 61 confront one another and converge toward an elongated entry slot 63 defined by confronting parallel spaced edges of the shelves 62. An arcuately curved external surface 64 is provided on each frame member; it has the same curvature radius as the internal surface 44 of the body member 40 against which it is received. The neck opening 7, slightly smaller in diameter than the internal surface 44 of the body member 40, permits arcuate shoulders 66 on the upper frame portions 58 to seat against the end of the receptacle neck 9. The shoulders 66 are provided by the stepped radius construction of the upper frame portions 58. These frame portions may together constitute a complete circle or, as shown, each frame portion may have side edges 68 disposed in spaced parallel relation to the corresponding edges of the companion frame member. Desirably the upper end of the body member 40 is formed with a shallow inwardly directed annular radial flange 70 which provides an internal circumferential shoulder 71 engageable against the top edges of upper frame portions 58 to clamp the shoulders 66 against the top of the neck of the receptacle.

Figure 1:
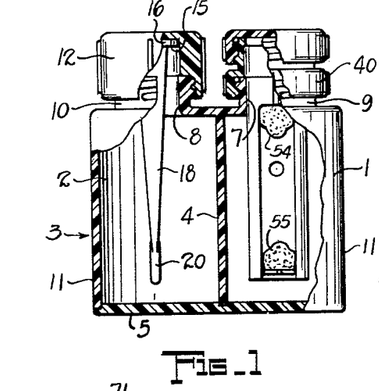
FIGURE 1 is a side elevational view, partly in section and with parts broken away and removed showing a lens washing kit of the character referred to comprising a receptacle having separate chambers for washing and rinsing solutions, a holder tongs carried in the rinsing chamber by the sealing cap for such chamber and a scrubber assembly supported on the neck which defines the opening into the washing chamber, sealing of the latter being effected by a separate cap screwed onto the scrubber assembly.
Figure 2:
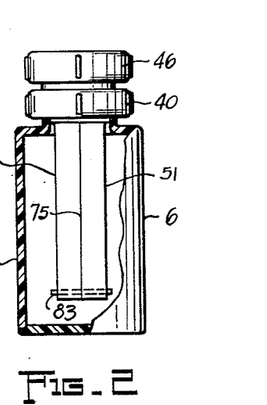
FIG. 2 is an elevational view of the right-hand end of the kit of FIG. 1, partly in section and with parts broken away and removed to show the interior of the washing chamber.
Figure 3:
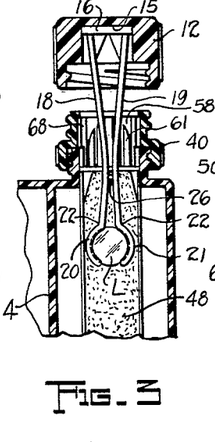
FIG. 3 is a fragmentary vertical sectional view through the washing chamber and the scrubber, showing the lens holder tongs partially inserted into the washway as in moving the lens up and down in a washing operation.
Figures 4, 5, 6, 7:
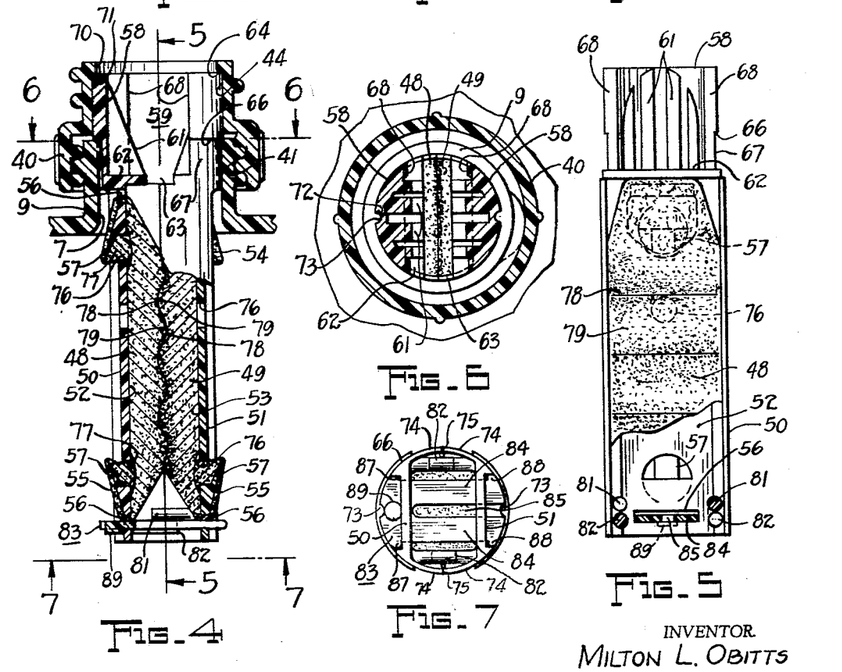
FIG. 4 is a fragmentary vertical sectional view through the scrubber assembly, with parts removed and enlarged with respect to the preceding figures, to show the washway for the lens and the identical character of the companion frame members comprising the scrubber.
FIG. 5 is a vertical view through the scrubber removed from the receptacle and with the tubular body member removed, this view being taken in the plane represented by the line 5—5 of FIG. 4.
FIG. 6 is a sectional detail taken substantially in the plane represented by the line 6—6 of FIG. 4.
FIG. 7 is a bottom end view of the scrubber, with parts removed, taken substantially in the plane represented by the line 7—7 of FIG. 4.

In order to prevent turning of the scrubber assembly in the neck 9, the latter is formed with vertically extending diametrically opposite radial ribs 72 (FIG. 6) received in vertical grooves 73 formed in surfaces 67 located below the shoulders 66 on the upper portions 58 of the frame members.

The lower portion of each of the frame members 50, 51 comprises a generally flat vertically elongated planar element the parallel vertical edges of which are integrally connected to the inside surfaces of arcuately curved or cylindrically shaped shell elements or portions 74 (FIG. 7) having substantially the same external curvature as the surfaces 67 of the upper frame portions 58. The shell portions 74 of the two frame members constitute segments of the same circle, abut one another along vertical meeting lines 75 and constitute side closure means for the washway. The shell portions thus limit the lateral movement of the tongs when the latter are manipulated in the washway for the purpose of washing a contact lens. If desired, a number of openings 76 are formed in the planar portions of each of the frame members 50, 51 to permit circulation of the washing liquid, to provide anchorages for lens holders (not shown) or to receive the tucked in ends 77 of the sponges 48, 49. The confronting faces of the sponges may be flat, although it is preferable that they be characterized as by complemental horizontal transverse ridges 78 and grooves 79.

At their lower ends the frame members 50, 51 are formed with projecting lugs 81, 82 which extend across the meeting lines 75. The lugs of one frame member are received behind the edges of the shell elements of the other to prevent lateral displacement of the members; the lugs of the members engage one another to prevent vertical displacement. The lugs 81 are offset axially from or are slightly higher than the lugs 82, each of the frame members having a pair of the lugs 81, 82. Thus the frame members 50, 51 may be identical, formed in the same molding cavity.

A snap fitted tie 83 holds the lower ends of the frame members together, preventing separation along the meeting lines 75. This tie is molded of resilient plastic material which may be the same as that of which the frame members of the scrubber and the tongs are formed. It is of U shape, having parallel leg portions 84 separated by an open ended slot 85. Aligned slots 86 in the lower ends of the frame members 50, 51 receive the legs 84 of the tie. The base of the tie has oppositely extending lugs 87 received behind the frame member 50 at the ends of its slot; the legs have lugs 88 received behind portions of the frame member 51 at the ends of its slot. A boss 89 centrally located on the base end of the tie can be engaged by an implement or the fingernail to aid in removal of the tie for disassembly of the scrubber as when it is desired to replace the sponges 48, 49. The boss 89 is also engageable by the frame member 50 to hold the tie in place. In removing and replacing the tie the distal ends of the legs 84 are squeezed together to permit the lugs 88 to clear the ends of the slot in the frame member 51. The slot 85 and a notch in the base end of the tie accommodate the ribs 72 in the receptacle neck as the scrubber is being inserted into or removed from the washing chamber.

Figures 8, 9, 10, 11, 11A, 12, 13, 13A, 14, 15, 16:
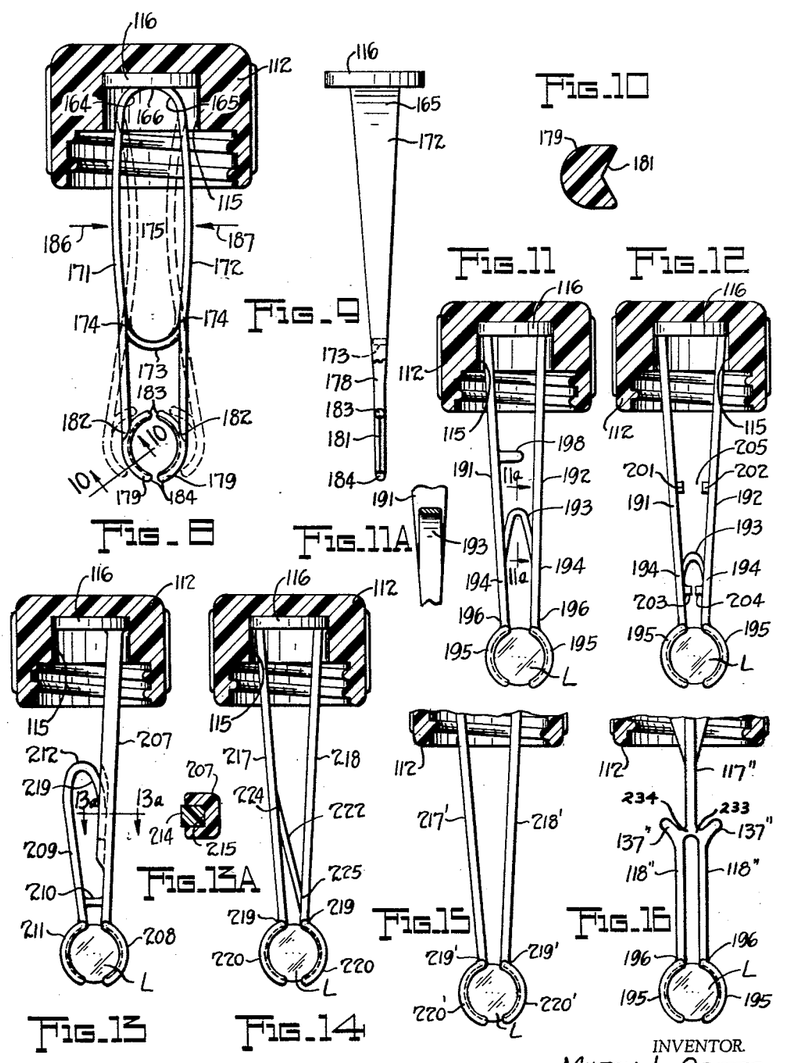
FIG. 8 is a front elevational view, partly in section, showing a modified carrier tongs.
FIG. 9 is a side elevational view of the carrier tongs of FIG. 8, partly in section and with parts broken away and removed.
FIG. 10 is an enlarged sectional detail taken substantially in the plane represented by the line 10—10 of FIG. 8.
FIG. 11 is a front elevational view, partly in section, showing another form of carrier tongs.
FIG. 11a is a sectional detail taken through the bridge fulcrum of the carrier tongs shown in FIG. 11.
FIGS. 12 and 13 are front elevational views, partly in section, showing other modified forms of carrier tongs.
FIG. 13a is a sectional detail through the leg and spring arm of the carrier tongs of FIG. 13, enlarged with respect to that view.
FIGS. 14–16 are front elevational views, partly in section and with parts broken away and removed showing still other modified forms of carrier tongs.

FIGS. 8–10 illustrate a modified form of carrier tongs made as by injection molding of a suitable resilient plastic material, as the carrier tongs previously described. A pair of legs 171, 172 tapered in width substantially throughout the length of the tongs are disposed in generally spaced parallel relation, their near ends 164, 165 being curved toward one another and having a common area of attachment 166 where they are integrally joined to the circular base 16 cemented into the recess 15 of the cap 12. The legs 171, 172 are integrally joined by a curved bridge 173 tangentially connected to the legs at 174. The bridge 173 is located beyond the mid point of the tongs and, together with the curved portions 164, 165 and the intermediate portions of the legs define an elongated loop or oval having an eye 175.

Extension portions 177, 178 of the legs 171, 172, respectively, are formed at their distal ends with arcuately curved lens holding elements 179. Each of these elements has an arcuate extent of about a third of a circle and, in cross section is somewhat C shaped (FIG. 10) providing a shallow groove 181 adapted to receive the circular edge of a contact lens to be held by the tongs. The portions 177, 178 of the legs are connected to the holding elements 179 in substantially tangential relation to the latter and at points 182 spaced from both near and distal ends 183, 184, respectively, of the holding elements.

Those portions of the tapered legs 171, 172 disposed between the bridge 173 and the anchorage area 166 where the legs are attached to the base 16 are bowed outwardly and, upon squeezing the loop as by applying thumb and forefinger pressure in opposite directions as indicated by arrows 186, 187, the legs 171, 172 are deformed as to the position indicated by the broken lines of FIG. 8, swinging the distal leg portions 177, 178 outwardly and separating the lens grippers 179. Thus a lens can be placed in lens receiving area 189. Releasing the squeezing pressure from the loop portion of the tongs allows the leg portions 177, 179 to be swung toward one another by inherent resiliency of the structure, the arcuate gripping portions 179 engaging the circular periphery of the lens and holding it securely.

FIG. 11 illustrates a modification in which thin legs 191, 192, tapered as the legs 171, 172 of FIGS. 8, 9, are also formed as by injection molding of suitable resilient plastic material. They have integral connection to a common base and are otherwise shaped similarly to the legs of the carrier tongs described herein and in my application referred to above; they are formed with an integral U-shaped connecting fulcrum 193. This fulcrum is tangentially connected to the legs 191, 192 at opposite points 194. The resilient fulcrum 193, which bends as a spring when the tongs are deformed to receive or release a lens, is several times greater in width than in thickness (FIG. 11a) its width being measured transverse to the plane of the drawing FIG. 11 in which the bending occurs.

Lens gripping elements 195 integrally formed on the distal ends of the legs 191, 192 at angular joints 196 are formed with substantially the same cross sectional shape as the elements 179 shown in FIGS. 8–10. They cooperatively define a lens receiving zone 197 which, in the unstressed condition of the tongs is smaller than shown since, in the drawings, the elements 195 are distended by the lens L. A laterally projecting bumper 198 integrally formed on the leg 191 is engageable with the leg 192 for the purpose of limiting the deformation of the legs in squeezing them to separate the lens holding elements 195. This bumper is positioned intermediate the fulcrum 193 and the base 167.

FIG. 12 illustrates a modification similar to that of FIG. 11, corresponding parts being indicated by the same numerals of reference. In lieu of the single bumper 198 the legs 191, 192 are formed with separate bumpers 201, 202, respectively, located approximately midway between the spring fulcrum 193 and the base 16. A second pair of bumpers 203, 204 are integrally formed on the legs 191, 192 substantially at the attachment points 194 of the U shaped spring fulcrum 193. The confronting ends of the near bumpers 201, 202, are separated by a space 205 so that the bumpers approach one another when the legs 191, 192 are deformed in swinging the holding element 195 apart to receive a lens. The bumpers 203, 204 are in abutment with one another and constitute a secondary fulcrum which prevents pinching together of those portions of the legs 191, 192 which are disposed adjacent the spring fulcrum 193. By this arrangement the spring fulcrum is protected against objectionable deformation by which it might be damaged or permanently deformed.

FIG. 13 illustrates a modification in which a single straight leg 207 is rigidly and integrally attached to the base 16. At its distal end the leg is formed with a lens holding element 208 similar and corresponding to the lens holding elements previously described. A companion leg 209 is integrally connected to the leg 207 by a flexible hinge element 210 in the provision of a walking beam arrangement. The leg 209 is formed at its distal end with a lens holding element 211 complemental to the element 208 so as cooperatively to define a zone for the lens L.

The near end of the leg 209 is formed with a reverse bend 212 so that a cantilever spring arm portion 214 is directed toward the hinge 210. This spring arm portion is received within the channel of the U shaped leg 207 (FIG. 13a) which confines the spring against lateral displacement while allowing slight longitudinal shifting. Squeezing the legs 207 and 209 together between thumb and forefinger pivots these parts at the hinge 210, swinging the lens holding elements 208, 211 apart in receiving or releasing the lens L.

FIG. 14 illustrates a modification comprising straight legs 217, 218 each of uniform thickness substantially from end to end but tapered in width as are the legs of FIGS. 1–7. The upper ends of these legs are integrally secured to the circular base 16 fast in the combined handle and cap 12. At their lower ends the legs are integrally connected at angle joints 219 with lens holding elements 220 corresponding to the holding elements previously described and having confronting arcuately curved faces formed with grooves that receive opposite portions of the periphery of the lens L. A diagonal bridge 222 having a cross section substantially the same as the bridge 193 of FIGS. 11 and 11a extends across the space separating the legs 217, 218, this bridge 222 being formed of the resilient plastic material comprising the legs and other parts of the holder. It is integrally formed with the legs in the injection molding process. Thus end 224 of the bridge is integrally connected to the leg 217 at a point approximately midway between the near end of the leg at the base 16 and the distal end of the leg at the joint 219; end 225 of the bridge is integrally connected to the leg 218 at a point of the latter located adjacent its angle joint 219.

In the molded unstressed condition of the grippers of FIG. 14 the lens holding elements 220 are located closer together than shown in the drawing in order that the lens L slightly displace the holding elements with the resulting stress maintaining the grip of the holding elements on the lens periphery.

The embodiment of FIG. 15 is similar to the grippers of FIG. 14, with the bridge 222 omitted. Accordingly, the corresponding parts are identified by the same numerals of reference.

FIG. 16 illustrates a modification of the carrier tongs wherein handle means comprises a near or proximate single leg portion 117" attached to the cap 112 as by means of a suitable base (not shown in FIG. 16) such as the circular base 116, previously mentioned. A pair of distal leg portions 118" extend as a continuation of the single leg and are disposed in spaced generally parallel relation. The leg portions 118" are attached to the near leg 117" through integral hinge sections 233, 234, respectively. These carrier tongs are tapered substantially throughout their length, having a profile in side elevation essentially that of the carrier tongs of FIGS. 8–10 or the application referred to. In order to facilitate manual manipulation of the bifurcated portion of the tongs, comprising the distal leg portions 118", the latter are formed with integral lateral projections 137". These projections make obtuse angles with the leg portions to which they are respectively attached and with one another. Their points of attachment are closely adjacent, preferably at, the integral hinges 233, 234. These hinges are, or at least one of them is, thinner or of less section than the projections 137" so that when the user applies pressure to the projections as by squeezing them between thumb and forefinger, the bending of the structure occurs at the hinges, or one of them, and not in the projections or legs. By such squeezing, the legs 118" are swung apart, opening up the lens receiving zone between the lens holders 195, thereby permitting the removal or insertion of a lens.

Several embodiments of the carrier tongs invention, as represented in FIGS. 3, 11–17, are shown with the lenses L gripped between the respective lens holding elements. This gripping is achieved by the inherent resiliency of the plastic material of which the carrier tongs are formed, it being understood that the lens holding elements of the several carrier tongs, in the natural or unstressed condition of the latter, are positioned slightly closer together than shown in the figures referred to; in use, they are held slightly distended by the lens located between and yieldingly gripped by the holding elements. FIG. 8 shows the approximate relative positions of the holding elements in the unstressed condition of the several carrier tongs.

Figures 17, 18, 19, 20, 21, 22, 23, 24:
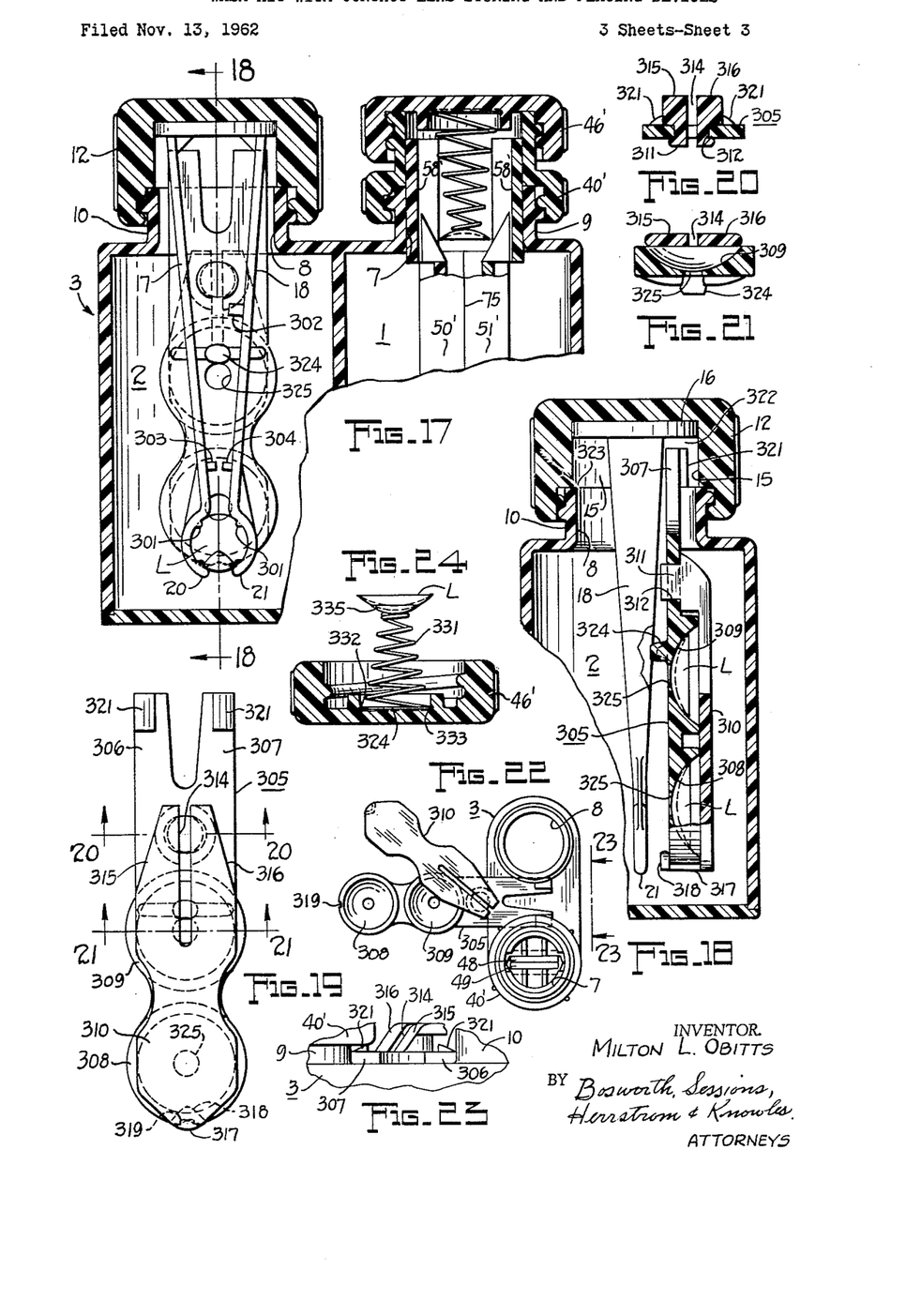
FIG. 17 is a fragmentary vertical sectional view taken longitudinally through a contact lens washing kit of modified construction incorporating a lens storage device and a device for use in placing a contact lens in the eye of the wearer.
FIG. 18 is a fragmentary transverse sectional view taken longitudinally through the kit of FIG. 17 substantially in the plane represented by the line 18—18 of that figure.
FIG. 19 is an elevational view of the lens storage device showing it separated from the carrier tongs, the side shown being opposite that shown in FIG. 17.
FIGS. 20 and 21 are sectional details taken transversely through the lens storage device substantially in the planes represented by the lines 20—20 and 21—21, respectively, of FIG. 19.
FIG. 22 is a plan view of the kit of FIG. 17 reduced in scale with the lens carrier tongs removed from the rinsing chamber, with the cap removed from the scrubber and with the lens storage device mounted on the receptacle, the cover of the storage device being swung clear of the lens receiving pockets.
FIG. 23 is a fragmentary elevational detail taken substantially from the plane represented by the line 23—23 of FIG. 22.
FIG. 24 is a sectional detail through the scrubber cap showing the lens placing device in elevation.

In FIGS. 17–24 is illustrated a modified kit for contact lenses, this kit including a device for storing a pair of contact lenses when not in use and a device for placing a lens in the eye. The parts and structural details of this kit are similar to those of the kit shown in FIGS. 1–7, like parts being designated by the same reference numerals. The legs 17, 18 of the carrier tongs are not connected together at any point beyond the base 16, each leg being cantilever supported solely by its rigid connection with the base. In this respect the carrier tongs are similar to the embodiment of FIG. 15. Lens holding elements on the distal ends of the legs are formed with pairs of protuberances 301 which straddle the lens periphery at circumferentially spaced points to locate and retain the lens between the confronting arcuately concave faces of the lens holding elements. A laterally projecting bumper strut 302 integrally formed on the leg 18 of the tongs is engageable with the other leg 17 to limit the deformation of the tongs when the legs are pinched together to spread the lens holding elements in releasing or receiving a lens. On each of the legs 17, 18, spaced from but close to the angle joints 22 relative to the full length of the tongs, are confronting protuberances or fulcrum posts or pads 303, 304, respectively. In FIG. 17 the confronting ends of these posts are separated from one another since the lens carrying tongs are slightly distended to receive and hold the lens L. In the unstressed condition of the tongs, the fulcrum posts 303, 304 abut one another, or substantially so. When it is desired to open the lens receiving area, squeezing together of the legs of the tongs in the region of the bumper strut 302 brings the fulcrum posts 303, 304 together and swings the lens holding elements 20, 20 apart so as to receive or release a lens, in the manner previously described.

Disposed alongside the carrier tongs in the rinsing chamber 2 is a lens storage device shown separately in FIG. 19. This device is formed as by injection molding of a suitable resilient synthetic plastic material such as that previously referred to in connection with the several forms of lens carrying tongs and the scrubber assembly. An elongated body member 305, bifurcated at one end, in the provision of a pair of side by side mounting legs 306, 307, is formed at its other end with shallow spherical recesses 308, 309 arranged in tandem. These recesses are of such a size as to be capable of holding the largest contact lens of the type it is desired to accommodate in the kit. The circular openings into the tops of the recesses are disposed in a common plane so that they can be closed by a common flat cover 310. This cover is suitably mounted on the body member 305 in captive relation as by means of a laterally projecting plug 311 formed on one end of the cover and received with a friction fit in a recess or aperture 312 formed in the body member 305. Desirably the cover 310 is formed with a longitudinal slot 314 which is continuous through the plug 311, dividing the latter into two segmental halves. Portions 315, 316 of the cover on opposite sides of the slot 314 are sprung apart, or the halves of the plug 311 are so spaced in molding as to require slight pinching together or deforming of such cover portions or plug parts in assembling the latter into the aperture 312. Thus is provided a strong frictional grip of the aperture walls on the plug to retain the cover in any desired rotative position. On its end opposite the pivotal plug 311, the cover 310 is formed with an integral right angled finger 317 having a reversely bent tip 318. When the cover is swung to that position in which it overlies the recesses 308, 309, as in FIG. 19, the finger 317 is received with a snap fit in a groove 319 formed in the end of the body member 305. This snap interfit constituting a detent arrangement for locating and retaining the cover in closed position relative to the pocket recesses 308, 309. In such position the fingertip 318 is received behind the body member 305, preventing raising of the cover away from the body member.

At their tip ends the legs 306, 307 are formed with sharp edged feet 321 which are received against the internal wall of the cap recess 15 when the lens storage device is placed as in FIGS. 17 and 18. The feet 321 are thus wedged in space 322 between the carrier tongs and the wall of the recess; the resulting frictional grip keeps the lens storing device assembled with and detachably mounted on the holder beside the carrier tongs for bodily insertion into and removal from the rinsing chamber 2 as a unit. The wall of the recess 15 is slightly larger in diameter than the neck opening 8 so that the ends of the feet 321 which project outwardly from the front surface of the body member 305 are engaged and supported by a shoulder 323 provided by the upper end of the receptacle neck 10. This inter-engagement prevents dislodgement of the lens storing device when assembled into the rinsing chamber 2 with the lens carrier tongs.

An integral boss 324 projecting from the bottom of the body member 305 is received between the legs 17, 18 of the carrier tongs, thus aiding in locating the parts in assembling them together; this boss also limits lateral shifting of the lens storing device so as to minimize the possibility of its becoming dislodged from the friction grip in the cap 12 during the insertion and removal of the assembly.

Through apertures 325 formed in the body member 305 in the bottoms of the pocket recesses 308, 309 permit the flow of fluids into and out of the pockets, make it easy to remove lenses stored therein.

When placing lenses in or removing them from the storage device the latter is preferably removed from the holder and conveniently supported in a horizontal position on the receptacle which serves as a mounting base. This is done as by wedging the mounting legs 306, 307 between the receptacle necks 9, 10 (FIG. 23). One of the feet 321 engages under the overhanging tubular member 40 of the scrubber assembly and reacts against the latter to prevent inadvertent dislodgement of the lens storing device when manipulating the cover 310 in the process of removing or replacing lenses from and into the pockets.

The scrubber assembly of FIG. 17 is similar to that described in connection with FIGS. 1–7 and corresponding parts have been designated by the same reference numerals. However, upper portions 58' of the scrubber frame members 50', 51' have external semi-cylindrical surfaces which together constitute a complete cylinder of uniform diameter. This cylindrical surface is nested against the cylindrical surface inside the tubular member 40', the latter surface and the neck opening 7 being of substantially the same diameter. A suitable bonding agent is used between the external cylindrical surface of the frame portion 58' and the internal surface of the tubular member 40' to secure the parts together.

The lens placing device is shown in FIGS. 17 and 22. A tapered helical coil compression spring 331 is anchored at its base end within the closure cap 46'. The cap is formed as by a ring wall 330 with a shallow circular axial recess 332 having an undercut annular groove 333 in the bottom of the wall to receive endmost circular turn 334 of the coil spring. This spring is formed of suitable corrosion resistant metal such as stainless steel; on its outer end is anchored a shallow plastic cup 335 in coaxial relation to the spring. The upper surface of the cup is so contoured as to accommodate the convex surface of a contact lens. As shown in FIG. 24, the cap 46' can be inverted to present the dish 335 uppermost so as to receive the lens L. Using the cap 46' as a handle, the user can easily manipulate a lens L into proper position against the eye. Since the concave curvature of the upwardly facing receiving surface of the dish 335 closely approximates or is complemental to that of the convex side of the lens, a film of liquid between the parts serves to retain the lens in the cup until it is properly positioned in the eye. Objectionable pressure against the eye is avoided because the soft spring 331 readily yields laterally as well as axially to accommodate lateral misplacement of the lens against the eye. When the cap 46' is applied to the tubular member 40' of the scrubber assembly, the spring 331 and the cup 335 are located for handy storage in the entry vestibule 59' of the scrubber as shown in FIG. 17.

The present invention thus provides a compact multipurpose kit for accommodating a pair of contact lenses. It stores the lenses when not in use; it provides means for easily cleansing and inspecting the lenses and for placing them against the eye. The lens storage device may, of course, be used separately from the washing and rinsing kit; it can serve as a safekeeping container for shipping or general handling. The scrubber can be used in a single chamber receptacle and the carrier tongs can be used apart from the washing kit as for general manipulation and handling of a contact lens.

In accordance with the patent statutes the principles of the present invention may be utilized in various ways, numerous modifications and alterations being contemplated, substitute of parts and changes in construction being resorted to as desired, it being understood that the embodiments shown in the drawings and described above are given merely for purposes of explanation and illustration without intending to limit the scope of the claims to the specific details disclosed.

What is claimed and intended to be secured by Letters Patent of the United States is:

1. A scrubber device insertable into and attachable to the neck of a bottle or other receptacle containing a cleansing solution for use in cleaning a lens or the like,
   said device comprising a pair of elongated rigid frame members disposed in spaced confronting generally parallel relation and adapted for insertion into and attachment to the neck of such a receptacle,
   the space between the members constituting a guideway and the members being formed to provide at one end of the guideway an opening aligned axially with it to permit insertion of a lens into the guideway through the neck of a recetpacle to which the members are attached,
   relatively soft deformable means in the guideway and carried by the frame members and providing a washway for an inserted lens, the frame members having external surfaces outside the guideway and being formed with apertures adjacent the ends of the washway which open through said external surfaces, the deformable means having ends extending through the apertures, retainer means projecting from the external surfaces of the frame members adjacent the apertures, the ends of the deformable means engaging the retainer means to resist withdrawal of the deformable means through the apertures under stresses imposed on the deformable means in lens washing operations.

2. A scrubber device insertable into and attachable to the neck of a bottle or other receptacle containing a cleansing solution for use in cleaning a lens or the like, said device comprising a pair of elongated rigid frame members disposed in spaced confronting generally parallel relation and adapted for insertion into and attachment to the neck of such a receptacle, the space between the members constituting a guideway and the members being formed to provide at one end of the guideway an opening aligned axially with it to permit insertion of a lens into the guideway through the neck of a receptacle to which the members are attached, relatively soft deformable means in the guideway and carried by the frame members and providing a washway for an inserted lens, the frame members having external surfaces outside the guideway and being formed at the ends of the washway with elongated slots transverse to the longitudinal axis of the guideway and, adjacent the slots, with through apertures, the deformable means having ends extending through the slots, across portions of the external surfaces of the frame members, and into the guideway through said through apertures.

3. A scrubber device insertable into and attachable to the neck of a bottle or other receptacle containing a cleansing solution for use in cleaning a lens or the like, said device comprising a pair of elongated rigid frame members disposed in spaced confronting generally parallel relation and adapted for insertion into and attachment to the neck of such a receptacle, the space between the members constituting a guideway and the members being formed to provide at one end of the guideway an opening aligned axially with it to permit insertion of a lens into the guideway through the neck of a receptacle to which the members are attached, relatively soft deformable means in the guideway and carried by the frame members and providing a washway for an inserted lens, the frame members having external surfaces outside the guideway and being formed at the ends of the washway with elongated slots transverse to the longitudinal axis of the guideway and, adjacent the slots, with through apertures, retainer means projecting from the external surfaces of the frame members and being located between the slots and the apertures, the deformable means having ends extending through the slots, across the retainer means, and into the guideway through said through apertures.

4. A scrubber device insertable into and attachable to the neck of a bottle or other receptacle containing a cleansing solution for use in cleaning a lens or the like, said device comprising a pair of elongated rigid frame members disposed in spaced confronting generally parallel relation and adapted for insertion into and attachment to the neck of such a receptacle, the space between the members constituting a guideway and the members being formed to provide at one end of the guideway an opening aligned axially with it to permit insertion of a lens into the guideway through the neck of a receptacle to which the members are attached, relatively soft deformable means in the guideway and carried by the frame members and providing a washway for an inserted lens, the frame members being formed with aligned apertures at the end of the guideway opposite the lens inserting opening, and a tie extending through the aligned openings, said tie having detent means on its ends and being resiliently deformable for insertion of the detent means through the aligned apertures in assembly, and said detent means being adapted to hold the tie ends anchored to the frame members to resist separation of the frame members during a lens washing operation.

5. A scrubber device insertable into and attachable to the neck of a bottle or other receptacle containing a cleansing solution for use in cleaning a lens or the like, said device comprising a pair of elongated rigid frame members disposed in spaced confronting generally parallel relation and adapted for insertion into and attachment to the neck of such a receptacle, the space between the members constituting a guideway and the members being formed to provide at one end of the guideway an opening aligned axially with it to permit insertion of a lens into the guideway through the neck of a receptacle to which the members are attached, relatively soft deformable means in the guideway and carried by the frame members and providing a washway for an inserted lens, the frame members being formed with aligned slots at the end of the guideway opposite the lens inserting opening, and a U-shaped tie extending through the slots, said tie having detent means received behind the frame members adjacent the slots, said detent means being adapted to hold the tie ends anchored to the frame members to resist separation of the frame members during a lens washing operation and the tie having leg elements adapted to be deflected in clearing the detent means through the slots.

6. A kit for cleaning a small fragile article such as a contact lens having a periphery defining a plane, said kit comprising receptacle means providing separate chambers for containing cleaning and rinsing liquids, said means having necks providing openings into the chambers, a holder for carrying an article to be cleansed, said holder comprising handle means removably mounted on one of the necks, elongated tongs fast to the handle means and extending through the opening in said one neck and into one of the chambers, said tongs being deformable to receive a lens and being resilient and formed to yieldingly grip a received lens, and hold the lens with the plane of its periphery parallel to the longitudinal axis of the tongs, a scrubber assembly comprising frame means mounted in another of the necks and extending into another of the chambers, said frame means defining an elongated guideway and having an upper end portion formed with an entry chamber and a slot communicating with the guideway, soft deformable washing means in the guideway and having confronting surfaces defining a washway in a plane parallel to said slot, the tongs and a gripped lens being receivable through the mounted frame means to insert the lens into said other chamber solely in such relation that the plane of the lens periphery parallels the entry slot for drawing such lens to and fro across the washing means.

7. A kit as in claim 6 which includes lens storage means providing lens receiving pockets, said storage means comprising a body and a cover, said cover being carried by the body in relatively movable relation to open and close the pockets, the storage body having an interfitting connection with and being detachably mounted on the holder with the storage means disposed in close juxtaposition to and alongside the tongs for bodily removal with the latter as a unit from and replacement in the one chamber.

8. A kit as in claim 7 in which the storage body includes a yieldable leg portion adapted to be wedged between the necks of the receptacle in temporarily mounting the storage means on the latter while placing lenses into and removing them from the pockets.

9. A kit as in claim 6 which includes lens placing means comprising a cap adapted to be mounted on said other neck as a closure for the opening into the other chamber,
 a dished lens receiving element,
 and, anchored at one end to the cap and at its other end being fast to the lens receiving element,
 a resilient spring supporting the lens element,
 the spring and the lens receiving element being receivable in the entry chamber when the cap is mounted as a closure.

10. A device for use in placing a contact lens in the eye of the wearer,
 said device comprising a handle to be grasped in manipulating the device,
 a dished surface lens receiving element,
 and, anchored at one of its ends to the handle and fast at the other of its ends to the lens receiving element,
 a helical coil compression spring having a longitudinal axis substantially normal to the dished surface.

11. A kit for storing and cleaning small fragile articles such as contact lenses and the like, said kit comprising receptacle means providing separate chambers for containing cleaning and rinsing liquids, said means having necks providing openings into the chambers, a lens holder removably mounted on one of the necks and comprising lens gripping means extending through the opening in said one neck and into one of the chambers, a scrubber assembly mounted in another of the necks and comprising frame means fast to said other neck of the receptacle and extending therefrom into another of the chambers, soft deformable washing means carried by the frame means within said other chamber so as to be immersed in liquid cleansing solution contained in such other chamber, such washing means comprising opposed confronting contacting elements defining the plane of an elongated washway aligned with the opening in said other neck, said lens gripping means being adapted to grip a lens, and the lens holder, upon removal from said one neck, being insertable into said washway in the other chamber through the opening in said other neck to carry a gripped lens axially along the washway in simultaneous deforming contact with the confronting washing elements for scrubbing both sides of the lens at once, said frame means including wall means generally transverse to the plane of the washway and extending along and closely adjacent to the soft washing means on opposite sides of the washway, said wall means being disposed and adapted to confine a lens being reciprocated in the washway while carried by the lens holder to a path substantially wholly within the lateral limits of the soft washing means.

12. A holding device for a lens or similar disc-like object having a thin periphery, said device comprising handle means adapted to be grasped for manipulating the device, a base fast to the handle means, leg means rigidly and integrally attached to and extending from spaced points of the base means and including a pair of resilient deformable legs disposed in side by side relation on opposite sides of and defining the longitudinal axis of the device, the legs each having a distal lens gripping end, an integral resilient bridge element connected between points of the legs spaced from both their attached and distal ends, the length of the bridge element being greater than the shortest distance between its point of attachment to one of the legs and the other leg, the bridge element and the legs being adapted to be readily deformed to swing the distal ends of the legs apart, said distal leg ends normally being spaced from one another on opposite sides of said axis and when so swung defining between them a lens receiving zone substantially surrounded by the lens gripping ends, one of said leg ends including a portion having a contour complemental to the periphery of a lens to be held in the device and a relatively long dimension parallel to said axis, said legs being further adapted to return by inherent resiliency toward normal with the distal ends of the legs yieldingly gripping a received lens, said leg end portion being formed to straddle and engage circumferentially spaced portions of the periphery of a received lens in the provision of an interlock to prevent lateral displacement of the lens from said zone, and said one distal lens gripping end being relatively thin transverse to its long dimension to provide substantially unobstructed access to the surfaces of a lens so received and gripped.

13. A holding device for a lens or similar disc-like object having a thin periphery, said device comprising handle means adapted to be grasped for manipulating the device, leg means including a pair of resilient deformable legs attached to and extending from the handle means in side by side relation and disposed on opposite sides of and defining the longitudinal axis of the device, the legs each having a near end rigidly attached to the handle means and a distal lens gripping end, the legs each constituting a cantilever beam supported solely at its near end by said attachment to the handle means, said leg means being adapted to be readily deformed to swing the lens gripping ends of the legs away from one another, said distal leg ends normally being spaced from one another on opposite sides of said axis and when so swung apart defining between them a lens receiving zone substantially surrounded by said lens gripping ends, one of said leg ends including a portion having a contour complemental to the periphery of a lens to be held in the device and a relatively long dimension parallel to the axis, said leg means being further adapted to return by inherent resiliency toward normal with the distal ends of the legs yieldingly gripping a received lens, said leg end portion being formed with a groove disposed in a plane containing the axis to receive the periphery of a received lens in the provision of an interlock to prevent lateral displacement of the lens from said zone, and said leg end portion being relatively thin transversely to its long dimension thereby providing substantially unobstructed access across such end portion to the surfaces of a lens received between and gripped by the distal leg ends.

14. A holding device for a lens or similar disc-like object having a thin periphery, said device comprising:
 handle means adapted to be grasped for manipulating the device,
 leg means attached to and extending from the handle means and including
  a pair of resilient deformable legs disposed in side by side relation on opposite sides of and defining the longitudinal axis of the device,
   the legs each having an end near and attached to the handle means and a distal lens gripping end,
    the attachment of at least one of the legs to the handle means including relatively thin sectioned hinge and spring means integral with such one leg adapted to be readily deformed to swing the distal end of said one leg away from the axis,
   said distal leg ends normally being spaced from one another on opposite sides of said axis and when said one leg end is so swung defining between them a lens receiving zone substantially surrounded by the lens gripping ends, one of said leg ends including a portion having a contour complemental to the periphery of a lens to be held in the device and a relatively long dimension parallel to the axis, said hinge means and spring means being further adapted to return by inherent resiliency toward normal with the distal ends of the legs yieldingly gripping a received lens, said leg end portion being formed to straddle and engage circumferentially spaced portions of the periphery of a received lens in the provision of an interlock to prevent lateral displacement of the lens from said zone, and said distal lens gripping ends being relatively thin transversely to their long dimensions to provide substantially unobstructed access across said distal ends to the surfaces of a lens so received and gripped.

15. A holding device for a lens or the like having a thin circular periphery, said device comprising a pair of resilient deformable legs disposed in generally side by side relation and having near ends integrally connected together and distal ends formed with gripping portions which first diverge and then converge to define a lens receiving zone substantially surrounded by such gripping portions, fulcrum means carried by one of the legs and engageable with the other leg at a point intermediate the near end thereof and the gripping portions and limiting movement of the legs toward one another at such intermediate point, the legs being adapted, when squeezed toward one another in a region intermediate their near ends and the fulcrum means, to pivot about the fulcrum means and swing the gripping portions apart for receiving a lens between them, the legs being further adapted, when relieved of such squeeze, to return by inherent resiliency toward their normal condition and grip and substantially surround a received lens with the fulcrum means and said other leg disengaged.

16. A holding device as defined in claim 15 in which said fulcrum means comprises a cantilever protuberance integrally formed on the one leg.

17. A device for use in cleaning a contact lens or the like comprising a receptacle adapted to contain a cleansing liquid and having a neck terminating in an access opening, a scrubber extending through the opening into the receptacle, said scrubber comprising frame means having spaced confronting members defining between them an elongated guideway aligned with the opening, said frame means having an upper end portion formed to define an entry into the guideway, said end portion on its outside and the neck on its inside having interfitting formations interlocking the scrubber and the receptacle, and relatively soft deformable means carried by the frame means and disposed in the guideway, said soft means being disposed for wiping engagement with a lens moved longitudinally in the guideway.

18. A device for use in cleaning a contact lens or the like, said device comprising:

a receptacle adapted to contain a cleansing liquid and having an access opening and a scrubber adapted to be received in the receptacle through the opening and supported by the receptacle, said scrubber comprising frame means defining an elongated guideway adapted to receive a lens carrier and a lens held by such carrier, a pair of relatively soft deformable lens engaging elements carried by the frame means and disposed in the guideway in confronting relation, said deformable elements having opposed surfaces defining a washway plane and being adapted for wiping engagement with a lens moved longitudinally in the guideway in said plane, and said frame means including walls transverse to said plane and generally parallel to one another on opposite sides of the guideway, said walls delineating the lateral extent of the guideway and being engageable with a lens carrier to confine the latter to a predetermined path.

19. A device for use in cleaning a contact lens or the like, said device comprising:

a receptacle adapted to contain a cleansing liquid and having an access opening and a scrubber adapted to be received in the receptacle through the opening and supported by the receptacle, said scrubber comprising frame means defining an elongated guideway adapted to receive a lens carrier and a lens held by such carrier, a pair of relatively soft deformable lens engaging elements carried by the frame means and disposed in the guideway in confronting relation, said deformable elements having opposed surfaces defining a washway plane and being adapted for wiping engagement with a lens moved longitudinally in the guideway in said plane, said frame means including walls transverse to said plane and generally parallel to one another on opposite sides of the guideway, said walls delineating the lateral extent of the guideway and being engageable with a lens carrier to confine the latter to a predetermined path, said frame means comprising a pair of identical members having elongated planar portions confronting one another in spaced parallel relation and constituting carriers for the lens engaging elements, and said transverse walls being secured to and along side edges of said planar frame portions.

20. A device for storing a contact lens or similar thin fragile article, said device comprising a body member formed with a shallow pocket having a planar opening through one side of the body, a cover member receivable against the body member as a closure for the pocket opening, one of the members being formed with a laterally projecting plug and the other of the members being formed with a recess in which the plug is received in interfitting relation, the recess having walls which frictionally engage and yieldingly grip the plug to permit relative swinging of the members in removing the cover from and replacing the cover across the pocket opening and the relation of the plug and the recess constraining the members to swing parallel to the planar opening.

21. A lens storing device as defined in claim 20 in which one of the members is formed with a laterally projecting resilient finger having a tip receivable behind the other of the members to prevent raising of the cover member away from the body member.

22. A lens storing device as defined in claim 21 in which the member behind which the fingertip is received is formed with a groove adapted to receive the finger with a snap fit to locate and retain the members in predetermined relation.

23. A lens storing device as defined in claim 20 in which one of the members is formed with a laterally projecting resilient finger and the other of the members has a groove disposed to receive the finger with a snap fit to locate and retain the members in predetermined relation.

24. A lens storing device as defined in claim 20 in which the member formed with the plug is resilient and is also formed with a slot continuous through the plug, the slot dividing the plug into separated parts and the last mentioned member into portions which are adapted to be pinched together yieldingly in assembling the plug into the recess.

25. A lens storing device as defined in claim 24 in which the slot opens through one end of the member in which it is formed, said last mentioned member being bifurcated by the slot.

References Cited in the file of this patent
UNITED STATES PATENTS

| | | |
|---|---|---|
| 2,919,696 | Rinaldy | Jan. 5, 1960 |
| 3,007,566 | Morris | Nov. 7, 1961 |
| 3,063,083 | Obitts | Nov. 13, 1962 |
| 3,091,328 | Leonardos | May 28, 1963 |